PACKAGES

Filed Dec. 23, 1957 5 Sheets-Sheet 1

INVENTOR.
JOSEPH H. SHERRILL
BY
Robert S. Dunham
ATTORNEY

PACKAGES

Filed Dec. 23, 1957 5 Sheets-Sheet 2

INVENTOR.
JOSEPH H. SHERRILL
BY
Robert S. Dunham
ATTORNEY

INVENTOR.
JOSEPH H. SHERRILL
BY
Robert S. Dunham
ATTORNEY

June 5, 1962 J. H. SHERRILL 3,037,683

PACKAGES

Filed Dec. 23, 1957 5 Sheets-Sheet 4

INVENTOR.

JOSEPH H. SHERRILL

BY

Robert S. Dunham

ATTORNEY

PACKAGES

Filed Dec. 23, 1957 5 Sheets-Sheet 5

INVENTOR.
JOSEPH H. SHERRILL
BY
Robert S. Dunham
ATTORNEY

United States Patent Office 3,037,683

Patented June 5, 1962

3,037,683

PACKAGES

Joseph H. Sherrill, Winston-Salem, N.C., assignor to R. J. Reynolds Tobacco Company, Winston-Salem, N.C., a corporation of New Jersey Filed Dec. 23, 1957, Ser. No. 704,802
4 Claims. (Cl. 229—44)

This invention relates to packages, and in an important specific aspect is directed to cigarette packages, a chief object being the provision of an improved package or box of crush-resistant character, which may be called a crush-proof box or wrapping, for cigarettes.

Conventionally cigarettes are sold in packs of a predetermined number, usually twenty, with a wrapping or enclosure which has varied widely in form, from the common combination of foil, paper and cellophane to rigid cardboard boxes with inner linings and outer coverings. In general the basic requirements of a cigarette package are to afford mechanical protection for the enclosed cigarettes, to provide a sufficient extent of impermeability of the enclosure for avoiding or delaying the drying-out of the tobacco or other deterioration caused by access of the atmosphere and to permit ready opening of the package by the user with simple manipulation and without destroying the package, so that it can be employed to hold the cigarettes until they have all been consumed. A further desideratum is that the package be not only capable of manufacture by machine, i.e. by mechanical operation which includes the loading of the partially completed wrapping with the cigarettes, but also such that its manufacture is efficient and economical, both in quantity and nature of materials required and in the number of machine steps or operations needed.

It has been difficult to satisfy all of these objects in the nature of cigarette packages and their manufacture, especially in that the attainment of desired results in one respect had militated against a full realization of other needed advantages. For example, although an outer wrapping of transparent plastic sheet material has been widely used as affording an easily applied, fully sealed enclosure, the nature of such wrapping sheet has required the inclusion of special tear strips or other means to facilitate manual opening of the wrapping. Furthermore, because of certain unavoidable permeability of these outer transparent wrappings, it has been necessary to retain a foil wrapping, for added resistance to access of air, along with supplemental paper layers for mechanical strength and protection. In contrast to the multiple paper and foil type of wrapping, carboard boxes with hinged end covers have been employed, for greater crush resistance, the general organization of such boxes being relatively complex and usually requiring a plurality of pieces in order to achieve the desired relationship of cover and box body. Furthermore it has usually been deemed necessary to retain an inner linning of foil material, as well as an outer, removable, sealed wrapping of transparent film.

The present invention is designed to afford a substantial improvement in the packaging of cigarettes, particularly in the provision of an improved package or box assembly which fulfills the above requirements in an unusually effective and efficient manner. Specifically, the new package involves a remarkably simplified structure which affords a full measure of mechanical protection and likewise a high and long lasting resistance to access of the atmosphere to the enclosed cigarettes, while at the same time providing exceptionally convenient and easily manipulated means for opening the sealed package, to withdraw the contents, e.g. one at a time or otherwise as desired.

To these and other ends, the improved cigarette package comprises a crush-resistant cardboard box, which may be of conventional, oblong rectangular shape as to hold twenty cigarettes in three rows, with an enclosing, sealed wrapping of unitary, substantially impermeable sheet material, specifically foil reinforced at its inner side. The box, which may be folded from a single piece or blank, as explained below, includes a hinged flap portion in its top wall, i.e. a flap which constitutes an integral part of such wall, over a portion adjacent to one end, the flap being movable upwardly from a closed position, to provide access through the resulting opening across about one-fourth to one-third of the top of the package. The box is further constructed and arranged, particularly in the structure and relationship of the flap and the side wall means extending vertically below the flap, for effectuating lifting engagement at the underside of the flap by simple manipulation, e.g. exertion of manual force at an appropriate wall region immediately below such flap. The sealed wrapping surrounding the box is yieldable and rupturable to permit the described manual operation, e.g. yielding to afford engagement, by thumb or finger, with the underside of the flap, by virtue of the stated relationships in the box structure, and rupturing, around the flap, when the latter is raised by the simple and relatively slight manual force applied.

The entire labeling of the package may be conveniently effectuated by imprint directly on the outer, foil surface of the wrapping. That is to say, the foil wrapping material may be printed, in its blank unwrapped form, with all of the design, names and legends desired for the package, such printing directly on the foil surface being additionally advantageous in providing a bright and attractive product.

Although one or another individual elements or materials of the package may have been heretofore used or proposed (including the provision of an integral hinged flap in the top wall of a one-piece cardboard box), the complete combination of the several features affords a cooperative relationship of the latter to attain new and eminently desirable results. Specifically, the package achieves the objects of a simplified structure with effective mechanical and atmospheric protection for the cigarettes and with true "easy-opening" characteristics, in a manner not heretofore realized. The entire package can be constituted with only two materials or pieces of material, viz. the single box blank and the single sheet of unitary, outer wrapper. With the latter fully sealed, as by appropriate adhesive between its overlapping portions and preferably between certain parts of its inner face and the box, an unusually high degree of imperviousness is achieved, against drying of the tobacco or other adverse effects of the atmosphere on the enclosed cigarettes. At the same time, the cardboard box contributes very effective mechanical protection, indeed with additional cushioning and reinforcement by the outer wrapping, so that the entire package is highly crush-resistant. Finally, the described instrumentalities, including the flap and the special structure and relationship of the flap and side walls, afford ready opening, to get out the cigarettes, by simple manual effort, the nature of the sealed wrapping cooperating with the easy-opening structure in that the reinforced foil is yieldable to permit the stated manipulation and is, or can be made readily rupturable to result in automatic severing of the wrapping when the flap is raised. Consequently the novel cigarette package is characterized by distinct advantages, both in economy of manufacture and in effectiveness for its purpose. The cigarettes, so packaged, may be kept for long periods of time without deterioration, yet the package is readily opened without special force or other annoyance, and provides a highly rigid structure for holding the cigarettes, both before and after opening, against mechanical damage.

Further and important specific features of the new package are described hereinbelow, likewise cooperating to the attainment of the foregoing and other advantages in structures of this type. By way of illustration, several examples of packages are disclosed, having different structural embodiments in various respects, it being understood, nevertheless, that certain features of each embodiment may be included or substituted in others, when desired, for achievement of various specific results.

These embodiments are shown in the accompanying drawings, as follows, it being further understood that for brevity of illustration many of the figures show the wrapping or blank materials, and the partially or fully completed boxes and packages, in fragmentary form or with certain features or details omitted:

Figures 11, 12, 13, 14:
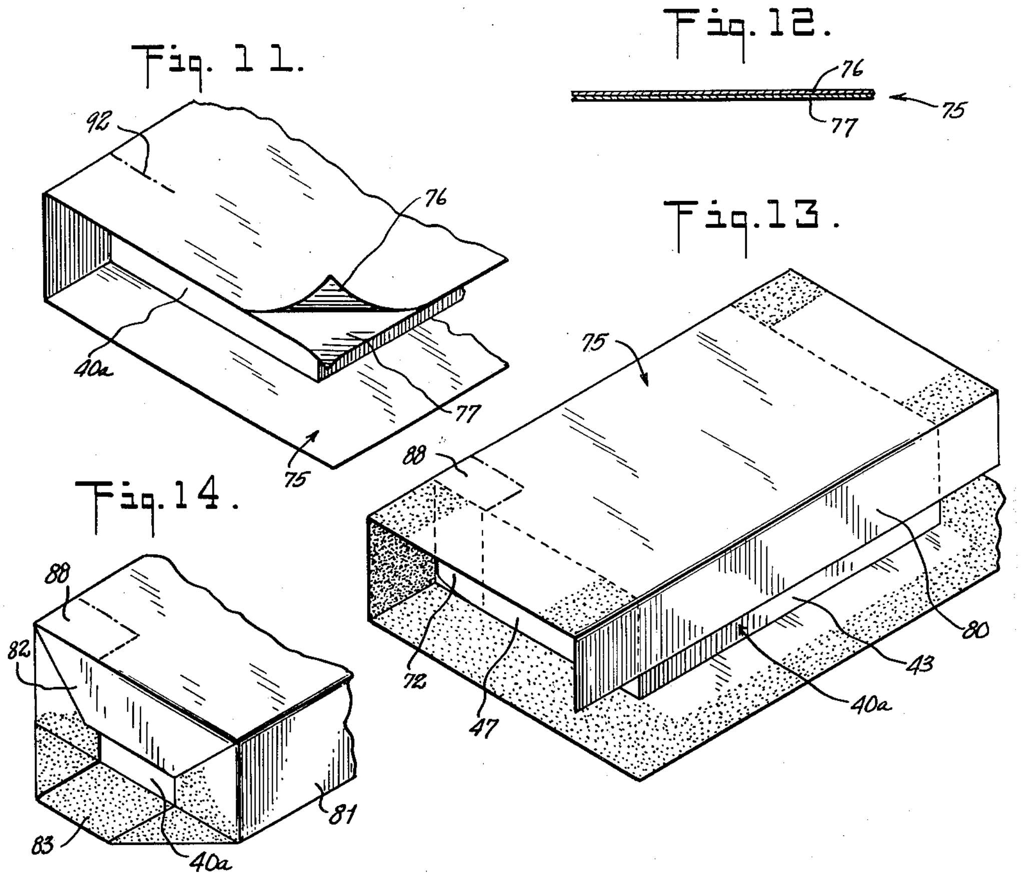
FIG. 11 shows the wrapper folded about the box, with the foil partially pulled away from the reinforcing layer to illustrate the lamination.
FIG. 12 is a greatly enlarged section of the wrapper sheet.
Figure 15:
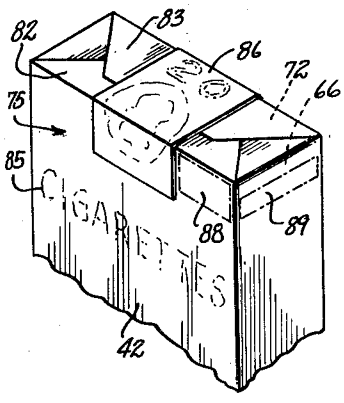
Figure 16:
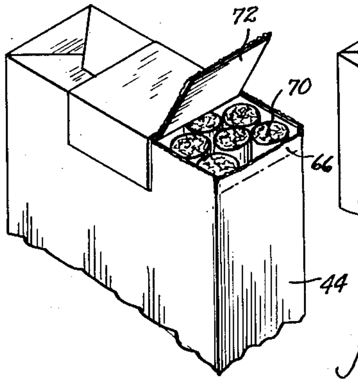
Figure 17:
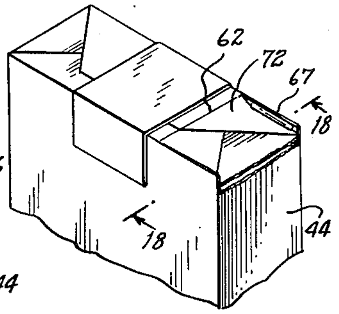
Figure 18:
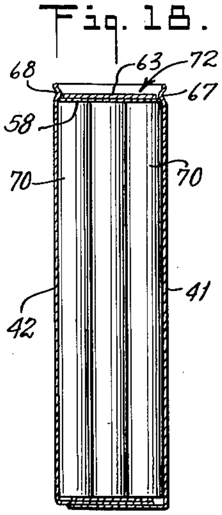
Figure 19:
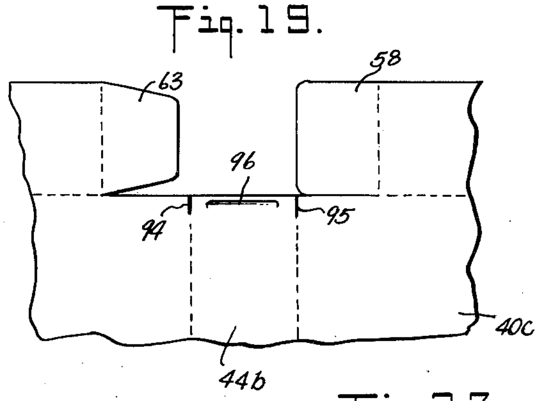
Figure 21:
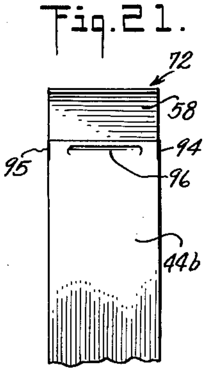
Figure 23:
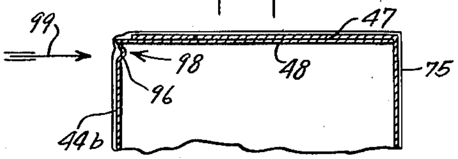
Figure 20:
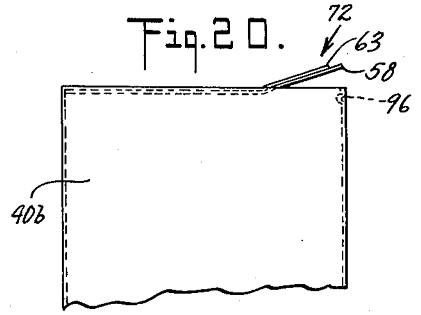
Figure 22:
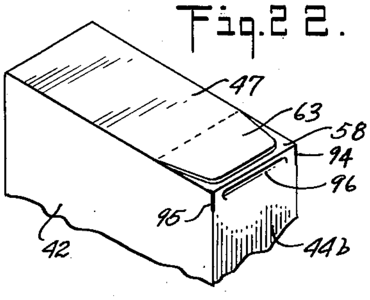
Figure 24:
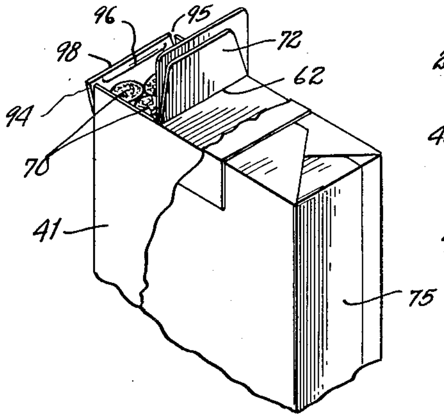
Figure 25:
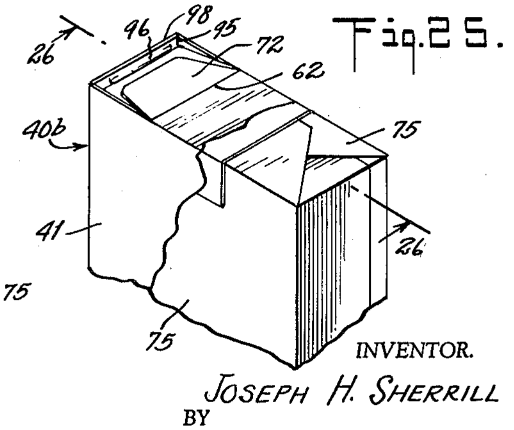
Figures 26, 27, 28, 29, 30, 31, 32, 33, 34:
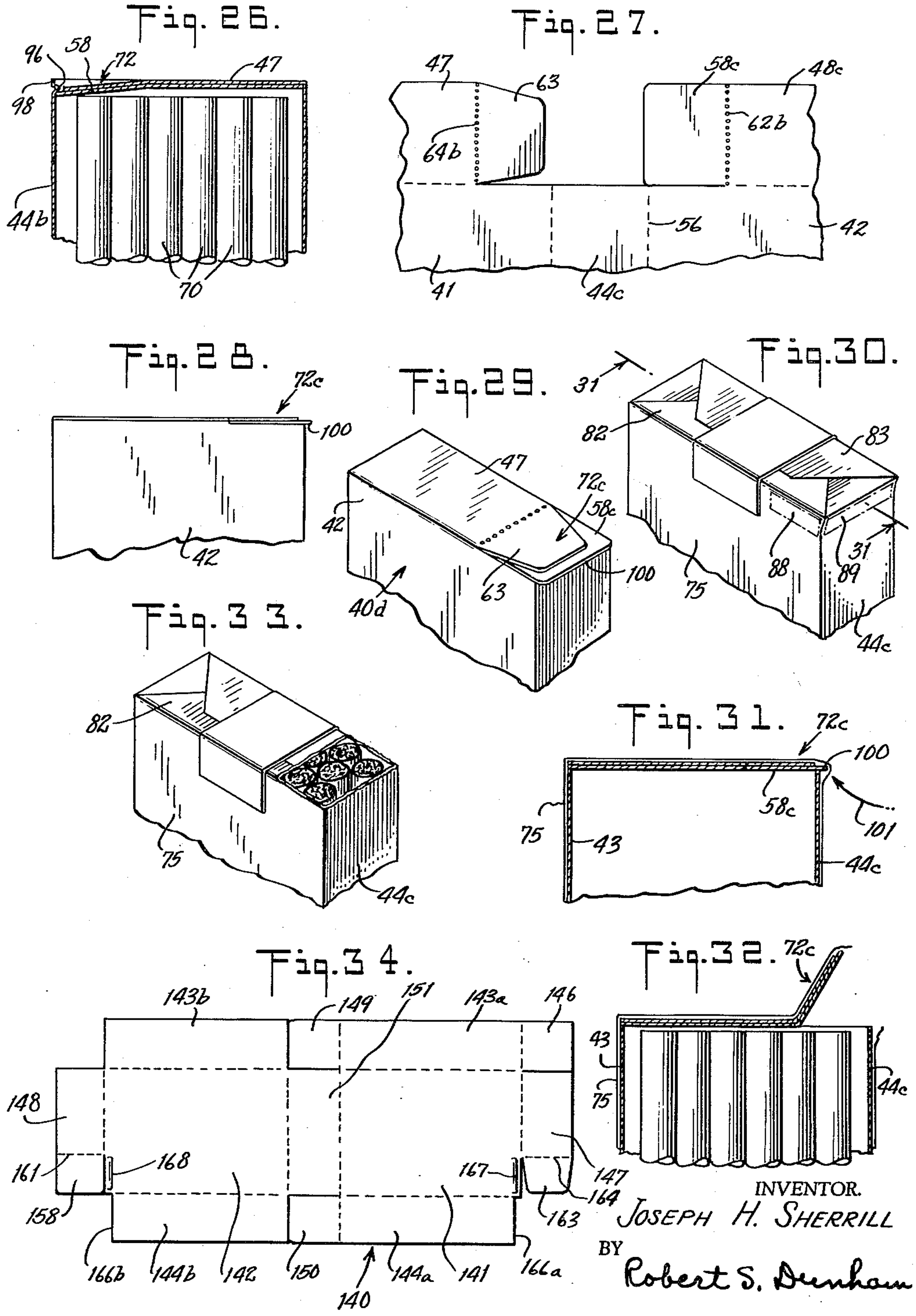

FIGS. 13 and 14 respectively illustrate successive stages in one mode of wrapping the reinforced foil sheet around the box;

FIG. 15 is a perspective view of the upper portion of the completed package;

FIGS. 16 and 17 are views similar to FIG. 15, showing the package respectively in opened and re-closed conditions;

FIG. 18 is a vertical section of the package, on line 18—18 of FIG. 17;

FIG. 19 shows in plan a fragmentary portion of a modified box blank for another embodiment of the invention;

FIGS. 20 and 21 are respectively side and end elevations of the upper portion of a package embodying the form of invention using the blank of FIG. 19, with the flap raised;

FIG. 22 is a perspective view of the upper portion of the box of FIG. 20 with the flap closed;

FIG. 23 is a vertical section of the upper portion of the completed package of the embodiment of FIG. 20, on a plane parallel to the wide side walls of the box, showing the inward depression of the narrow side wall at the top for lifting engagement of the flap;

FIGS. 24 and 25 are perspective views of the upper portion of the completed package of FIG. 23, with the flap respectively in opened and re-closed conditions;

FIG. 26 is a vertical section on line 26—26 of FIG. 25;

FIG. 27 shows in a fragmentary view in plan another modified box blank for a third embodiment of the invention;

FIGS. 28 and 29 are respectively a side elevation and perspective of the upper portion of a box made with the blank of FIG. 27;

FIG. 30 is a perspective view of the upper portion of a completed package of the embodiment represented by FIGS. 27 to 29;

FIGS. 31 and 32 are fragmentary vertical sections, taken on line 31–31 of FIG. 30, showing this third embodiment of the completed package, respectively before and after the opening operation, to lift the flap;

FIG. 33 is a perspective view of the upper portion of this third embodiment of package, with the flap opened and removed; and FIG. 34 is a plan view of another form of cardboard blank from which the box structure of the invention may be made.

FIGS. 1 to 18 inclusive show one embodiment of the invention, including the mode of packaging the cigarettes in a cardboard box and enclosing the latter with a sealed foil wrapper, with structural provision for effectuating the ready manual opening of a hinged flap or tab at the top of the box, by suitable manipulation through the sealed wrapper. It should be understood that although a specific arrangement of parts in the box blank is set forth, and likewise a specific sequence of folding and closing operations for such blank and a selected mode of wrapping the foil sheet are shown, other arrangements of the cardboard blank, and also other modes of folding or assembling, may be employed, and similarly the foil sheet may be wrapped and have its parts tucked or folded in other of the conventional ways for applying a complete wrapper sheet to a cigarette package.

Figure 1:
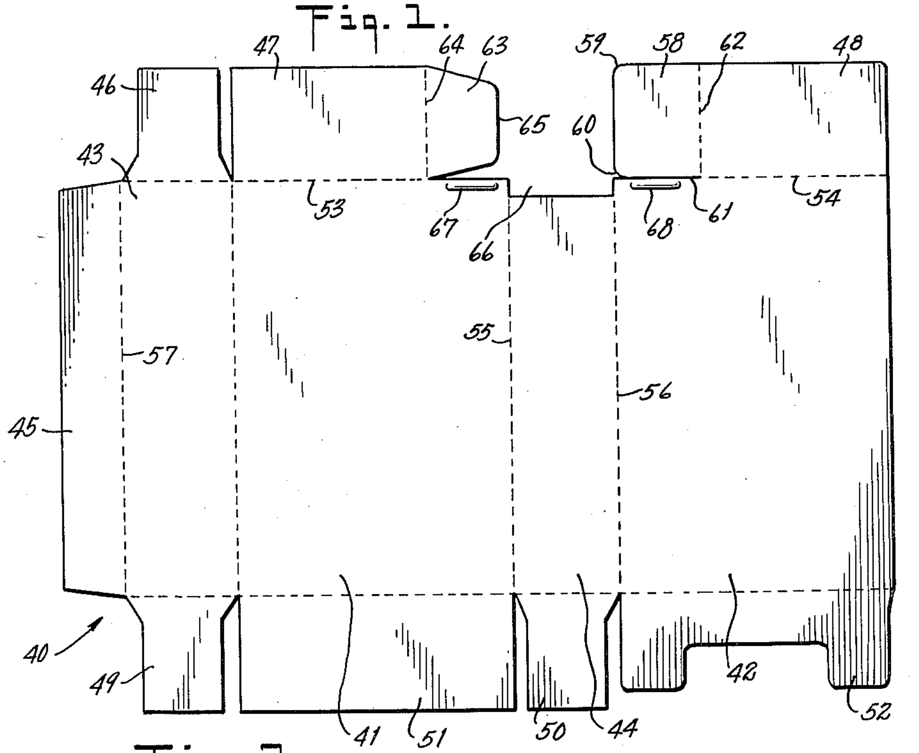
FIG. 1 is a plan view of a cardboard blank suitable for folding and gluing to constitute the inner box structure of the invention.
Figure 2:
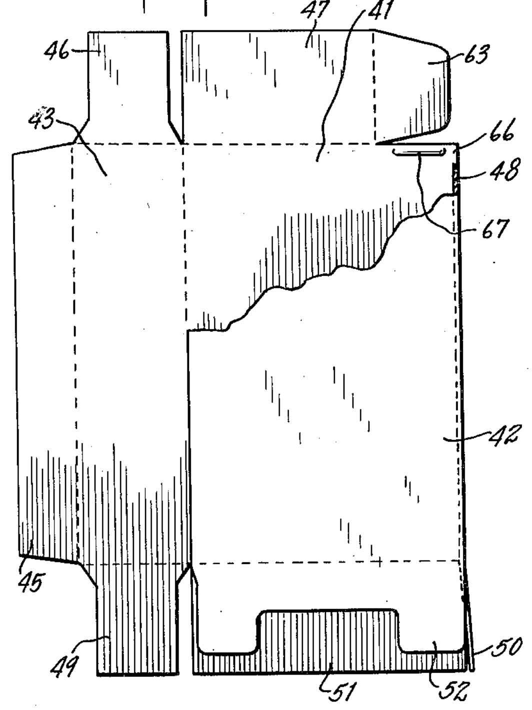
FIG. 2 shows the blank with one wide wall (partly cut away) folded over.
Figure 3:
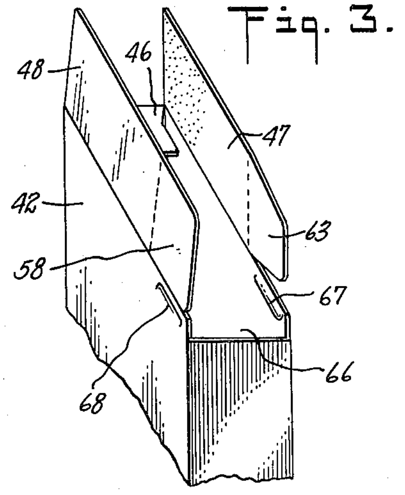
FIGS. 3 and 4 are perspective views of the top of the structure showing respectively successive stages in the folding and assembly of the top wall with its flap.

Referring to FIG. 1, the box blank 40 consists of a single integral piece of cardboard, preferably white in color and having moderately light weight but having sufficient rigidity or stiffness for the desired resistance to crushing. As shown, the blank includes portions respectively intended to provide wide side walls 41, 42, narrow side walls 43, 44 and an integral tab or flap 45 to secure the assembled walls. For the top end of the package there is an end tab 46 extending from the narrow wall portion 43 and long tabs or flaps generally designated 47, 48 along the top edges of the wide wall portions 41, 42 respectively. For the bottom of the box there are narrow tabs 49, 50 and wide tabs 51, 52 (the latter being of abbreviated shape), respectively projecting from the narrow and wide side wall portions as indicated. For facility in folding or forming the box, the lines of juncture among the several portions, for example as at 53, 54, 55, 56 and 57, as well as others shown but not designated, may be preliminarily scored or creased.

To provide the hinged flap in the ultimate package, the upper tab 48 includes a flap portion 58 at one end, which may be of full size to cover the corresponding top region of the assembled box, except that the corners 59, 60 may be slightly rounded. This tab 58 is severed from the wall portion 42 at line 61 and an appropriate score or crease 62 is provided in the surface of the part 48, in such fashion as to constitute a hinge region for the flap 58. The other top tab 47 also includes a flap 63 correspondingly hinged by a score or crease 64. Although this tab can in some cases be made full size, it is conveniently of reduced contour, having its end 65 inwardly spaced from the end wall of the package and having tapering side boundaries as shown.

The vertical side wall portion 44 is cut away at its top end, as indicated at 66, i.e. so that the upper edge of the portion 44 is lower than the top corner folds 53, 54 of the side walls by a small amount, for example by a vertical distance of one-eighth inch. A further, preferred feature of the completed package being supplemental means to hold the hinged flap in closed position after it has opened and moved down again, means for such purpose are conveniently provided in the box blank, as by a pair of pressed or embossed ridges or beads 67, 68, along regions of the side walls 41, 42 near the end wall corners 55, 56 and extremely close to the upper edges of these walls. Such ridges or beads are provided to constitute means projecting inwardly of the assembled box, at the described locality, and may be established by appropriate embossing or deforming operation on the box blank.

One mode of assembly of the box blank is shown in FIGS. 2 to 6 inclusive. Thus in FIG. 2 the side wall 42 has been folded over into parallel relation with the side wall 41, the upper part of the wall 42 and the tab 48 being removed from this figure so as to show the cut away or shortened condition of the narrow side wall 44 with the resulting recess 66. The other narrow side wall 43 can be turned at right angles to the wall 41 and the tab 45 disposed beneath the wall 42 (see FIGS. 5 and 6), the latter parts being secured by glue or other adhesive. At the top of the box the tab 46 is first folded down (FIG. 3) with the tabs 47 and 48 in upstanding position. Thereafter the tab 48 is brought down horizontally, being glued or otherwise adhered to the tab 46 (FIG. 4), and finally the tab 47 is folded flatwise across the top surface of the tab 48 and adhered thereto by glue or the like throughout the under-surface of the tab 47 as indicated.

Figures 4, 5, 6, 7, 8, 9, 10:
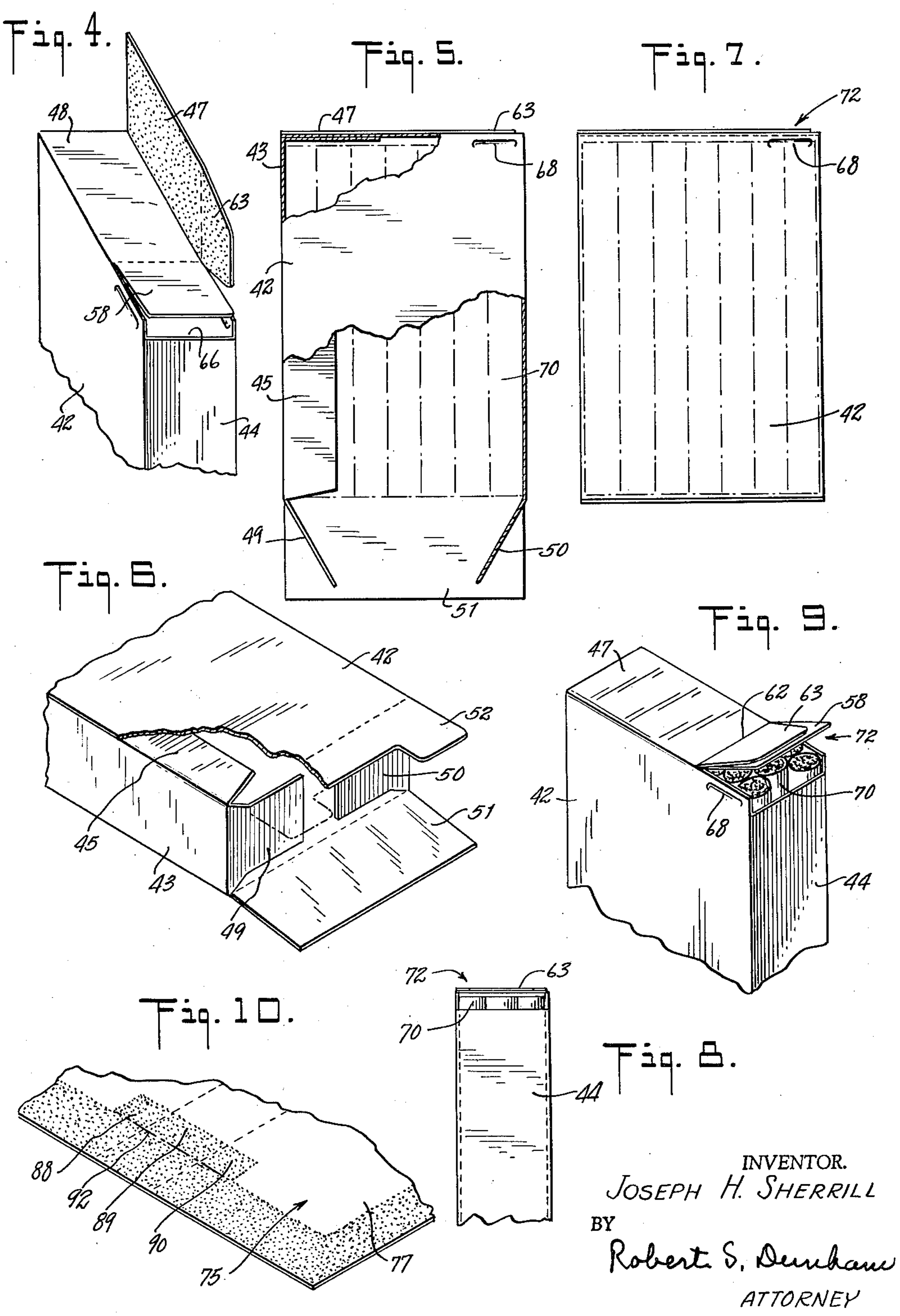
FIG. 5 is an elevation, partly cut away, of the box completed except at the bottom.
FIG. 6 is a perspective view showing the bottom of the box in partly completed state.
FIGS. 7 and 8 are respectively side and end elevations of the completed box, containing cigarettes.
FIG. 9 is a perspective view showing the upwardly swinging nature of the hinged flap.
FIG. 10 shows in perspective, the inner reinforcing face of the foil wrapper blank.

At an appropriate stage in the assembly of the box a bundle of the required number of cigarettes 70, say twenty cigarettes, is inserted, the time of doing so relative to the sequence of folding operations being such as may be appropriate for the machine or other instrumentality utilized for the purpose. Simply by way of example it is here indicated that the cigarettes 70 (shown in dotted lines in FIG. 5) are placed in the box through the bottom, after the top flaps 47, 48 have been closed. As seen in FIGS. 5 and 6, the bottom of the box is completed by folding the flaps 49, 50 inwardly, and then in succession, across them, the flaps 52, 51, with appropriate glue or other adhesive on the undersides of the last-mentioned flaps so as to secure these portions together. As shown in FIGS. 7, 8 and 9 the completed box is a unitary closed structure with the several wall, top and bottom portions folded into box-like contour and permanently retained by adhesive between the several overlapping surfaces. The dimensions of the blank, and those of the finished box, are appropriately selected so that the stated number of cigarettes is enclosed with suitable snugness, allowing for slight movement to accommodate the various opening and re-closing operations hereinbelow described. For instance, the box may be shaped to hold two outer rows of seven cigarettes each and an inner row between them of six cigarettes, the rows being parallel to the wide sides of the box. Adhered together, the flap portions 58, 63 constitute a unitary flap assembly designated 72 and hinged at 62 with respect to the remaining top wall 47 of the box. Normally the flap lies flat, as originally fabricated and as shown in FIGS. 7 and 8, its elevation in FIG. 9 being presented for purposes of illustration, where the cut away region or recess 66 at the top of the narrow side wall 44 is clearly apparent, as likewise are the inwardly projecting ridges 67, 68, represented by corresponding depressions in the outer surface of the cardboard box wall (see also FIG. 3). The opening in the top of the box, beneath the flap 72, is of appropriate size for later withdrawal of cigarettes, and may extend, for instance, for a distance of one-fourth to one-half the longer dimension of the box top. Thus where the top has a length of about 2⅛ inches (and width of ⅞ inch), the hinge 62 may be disposed about ⅝ to ¾ inch from the vertical plane of the wall 44.

Around the outside of the completed box there is placed a wrapper of reinforced foil sheet 75 (FIGS. 10, 11 and 12), which may be a laminated structure consisting of metal foil 76, preferably aluminum foil, and paper 77 flatwise adhered to each other by appropriate adhesive or bonding agent. Although various weights of paper or the like may be used for this purpose, including thinner or heavier material, effective results are achieved with a white paper designated as 35 pound stock. It will be understood that permanent lamination of aluminum or like metal foil 76 with paper 77 or equivalent fibrous or other reinforcement, is readily obtainable by methods now known, and that such composite sheet is available. In FIG. 10 the sheet 75 is shown with the paper-reinforcing side uppermost, while in FIG. 11, with the sheet 75 folded once about the box **40*a* the upper web of the sheet has the foil 76** exposed, the laminated nature of the wrapper being indicated by partial separation of the sheets.

One method of wrapping the box **40*a* with the sheet 75 is indicated in FIGS. 13 and 14, where the narrow flap 80 has been brought down along one narrow side 43 of the box (FIG. 13), an opposite flap 81 of the wrapper being then brought over and adhered to the flap 80, and the ends of the wrapper being tucked and folded into a pair of long tabs 82, 83 in a conventional way (FIG. 14). The overlapping portions of the wrapper sheet 75 are thoroughly adhered together with suitable adhesive, and suitable interior parts of the wrapped sheet are correspondingly adhered to the box 40*a* at suitable locations, for example preferably over the entire top and bottom regions of the box. While other means or materials may be employed (including the use of glue or other adhesive over the entire surface of the reinforcing paper), a particularly advantageous arrangement with best avoidance of wrinkles, is to print the blank wrapper sheet 75 (FIG. 10) with so-called hot-melt adhesive material at the various required localities, mostly on the inner, paper face, but also at certain localities of the outer foil sheet, especially for the formation and assembly of the end flaps 82, 83. With adhesive of this type pre-printed on the wrapper blank, the wrapping operation is first completed and then the package is carried to or past the heating station, where the application of heat to the appropriate surfaces softens or melts the adhesive and causes effective adherence throughout the desired regions. The disposition of the adhesive material is generally indicated in FIGS. 10, 13 and 14 (omitted from FIG. 11 for clarity), for the described operations. It will be understood that the mutual adherence of the various parts of the wrapper should be particularly thorough and complete, so that a completely sealed wrapping results, preferably fully secured to the enclosed box 40*a*, especially throughout the top surface 47, including the flap 72**.

The completed package is shown in FIG. 15, it being understood that the desired label design, as indicated at 85, may be printed directly on the foil side of the wrapper blank. The necessary revenue stamp 86 may be applied over the top of the package as shown. For neatness of the product after the flap has been later opened, and also particularly to cooperate in affording desired rupture and severance of the wrapper sheet around the edges of the tab 72, special adherence of the sheet to the box walls 42, 44 and 41 may be provided over regions immediately adjacent to the top opening beneath the tab. By way of example, rectangular areas of adhesive 88, 89, 90, i.e. of the hot melt type, are applied to the inner face 77 of the wrapper sheet (FIG. 10) so as to effect the desired local adherence by suitable application of heat as the package is completed. These special areas of adherence are similarly in part indicated, by dotted outline, at 88, 89 in FIGS. 13, 14 and 15.

The package of FIG. 15 thus represents the completed product, having the structure and characteristics described hereinabove and affording a strong, sealed, crush-resistant package of cigarettes, suitable for both mechanical protection and protection against atmospheric deterioration over long periods of time. To open the package, the user simply presses inward and upward with his thumb or finger at the region 66, now covered with the foil wrapper. By this simple manipulation, force is exerted on the underside of the flap 72, through the foil wrapper, which is of an inherently yieldable character, particularly in its wrapped relation over the opening 66. This upward force, which need be relatively small, suffices to raise the flap, at the same time rupturing or tearing the foil material around the edges of said flap. In consequence the flap is manually raised as shown in FIG. 16, providing access to the contained cigarettes, for withdrawal of one or more of them in convenient fashion. As will be seen, the mutual structure of the flap 72 and the narrow side wall 44 with its cut-away portion 66 is such as to effectuate the required manual engagement of the underside of the flap, i.e. through the cut-away region.

When it is desired to re-close the package or box, the flap is simply pushed down into place, and with the preferred additional feature of the inward projections 67, 68 (see also FIGS. 3 and 9), the flap 72 can be removably locked in closed position. That is to say, the flap is simply pressed down far enough so that it snaps under these projections, its stiff resilience permitting the slight bending necessary to accommodate it to this action, and the small tolerance of the fit of the cigarette bundle within the box likewise being such as to permit this re-closing without damage to the cigarettes 70. The re-closed condition of the box with the lower edge of the flap layer 58 retained beneath the indented projection 67, 68 is illustrated in FIGS. 17 and 18, the latter figure having the foil wrapping removed for clarity. Subsequent opening of the box is achieved simply by pressing the finger or nail beneath the outer edge of the flap 72 and raising it past the projections. The box may be readily re-closed and opened many times, as required by the user.

As will be understood, the foil wrapper is preferably of suitably yieldable and rupturable character so that the required opening operations are attainable as explained. In some instances, particularly where a heavy paper reinforcement is embodied in the unitary, reinforced foil sheet, these properties may be enhanced along the boundary of the flap 72 by suitable pre-treatment of the wrapper blank. For instance, as shown in FIGS. 10 and 11, the blank may be weakened or scored along a corresponding line 92, by pressure of a roller edge on and along this portion of the inner, paper surface.

As stated, the complete package of FIG. 15, constituted in the manner shown and described, affords a secure enclosure for the cigarettes, sealing them effectively for storage over long periods of time, and yet requiring only two elements or pieces of material, viz. the box blank 40 and the wrapper blank 75. The structure is highly rigid, forming a so-called crush-proof package, and has an unusually convenient arrangement for opening, i.e. by the flap 72, which requires neither special instruments nor unusual force. For convenience of the user, the box may be reclosed, with reasonable tightness, as many times as necessary.

A further embodiment of the invention is shown in FIGS. 19 to 26 inclusive, with corresponding parts identified by the same or similar reference characters. Here the box **40*b* is made in the same way from a blank 40*c*, FIG. 19, which is identical with the blank 40 of FIG. 1, except as follows. Instead of being cut away, the upper portion of the narrow side wall 44*b*, beneath the region of the flaps 58, 63, is of full height but has its side edges severed at 94, 95, say for a distance one-fourth inch below the top edge. Although inward locking projections may be provided in the side walls as at 67, 68, in FIG. 1, an alternative arrangement is here shown, comprising a similar inward projection or indentation 96 very closely adjacent to the top edge of the side wall 44*b***.

The completed box is illustrated in FIGS. 20 to 22 inclusive, the severed vertical edge regions at the top of the side wall **44*b* being indicated at 94, 95, and the locking bead or rib 96 being shown by its corresponding outwardly seen indentation. The complete flap 72, composed, as before, of the superposed, mutually adhered flap members 63, 58** is shown in raised position in FIGS. 20 and 21 and in its normally closed position in FIG. 22.

The assembled box is wrapped and sealed with the reinforced foil wrapper, exactly as in FIGS. 10 to 15 inclusive, and when completed appears as in solid lines in FIG. 15. To open the package, the user presses inwardly and upwardly with his thumb or finger at the uppermost region 98 of the side wall **44*b*, i.e. as indicated by the arrow 99 in FIG. 23, showing the manner in which this side wall portion 98 then moves inward, because of its freedom at the split or severed edges 94, 95. By such manipulation, lifting force is readily exerted on the underside of the tab 72, so that it can be pushed up to the position of FIG. 24, rupturing the foil wrapper around the edges of the tab. Thus access is afforded to the cigarettes, exactly as described in connection with FIG. 16. For clarity of illustration, the side wall portion 98 is shown in FIG. 24 as if bent slightly outward, it being understood that in practice the stiff resilience of the cardboard will normally retain this portion in truly vertical position although it may be bent momentarily outwards for still better access to the cigarettes 70. To re-close the package, the flap 72 is pushed back to horizontal position. If the locking projection 96 is provided, the flap is preferably moved down until its outer edge, i.e. the outer edge of its layer 58, seats beneath the projection 96, as shown in FIGS. 25 and 26. Thus the flap is releasably locked in closed position, but may be readily opened again by simple manipulation, e.g. at the end wall portion 98**. The package of FIGS. 19 to 26 thus affords essentially similar advantages and results, to those of the first-described embodiment.

A further embodiment of the invention is shown in FIGS. 27 to 30 inclusive. The box blank (FIG. 27) is essentially the same as in the other forms, but with the narrow side wall **44*c*, beneath the locality of the hinged flap extending fully to the top edge of the side wall region and fully continuous throughout its vertical edges. The upper flap member 63 is the same as in FIG. 1, but the lower flap layer 58*c* is elongated, i.e. extending beyond the line of the fold 56, and consequently beyond the edge of the narrow side wall 44*c*** (in assembled relation) by a short distance, for example $\frac{1}{16}$ inch.

Thus with the box blank folded and secured in the same fashion as for the other embodiments, e.g. as illustrated in FIGS. 28 and 29, the resulting flap structure **72*c* presents a projecting or overhanging flange or lip 100** at its outer end.

The box is wrapped with reinforced foil sheet, to provide a sealed enclosure, as in FIGS. 10 to 15, the resulting structure being shown in FIG. 30. It will be understood that in this instance, as likewise in the case of the embodiment in FIGS. 19 to 26, the foil wrapping is specially adhered to the underlying box **40*d* at localized areas immediately below the hinged flap, e.g. as shown at 88, 89 in FIG. 30. It will also be seen that the foil wrapping is sufficiently flexible to encase the box closely and neatly, despite the small projection constituted at the end of the flap 72*c***.

As illustrated in FIGS. 30 and 31, the package is opened by directing force by thumb or finger inwardly against the underside of the flap flange 100, such manipulation being indicated by the arrow 101 in FIG. 31. The foil wrapping yields sufficiently to effectuate the resulting pressure on the flap, so that it is raised, breaking the wrapping around its edges, as appears in FIG. 32. In consequence, ready and convenient access is obtained to the cigarettes, and the flap may be reclosed, if desired.

In some cases complete removal of the flap is advantageous, and while it is possible to tear this portion off along its hinge line 62 in the other embodiment, perforations along this line can be provided to facilitate such action. Thus in FIG. 27 the hinge-score lines **64*b*, 62*b* for the flap sections are provided with a row of perforations, so that when these lines are in registration in the assembled structure of FIG. 29, the flap 72*c* may be easily torn away. FIG. 33 shows the completed package after removal of the flap in such fashion. It will be appreciated that similar perforations can be included in the structures of the other embodiments (e.g. FIGS. 9 and 22), along the same hinge region, for like purpose. Similarly, the device of FIGS. 27 to 32 may be provided with inward locking projections or beads, for example similar to the projections 67, 68 of FIGS. 1 to 18 in the wide side walls 41, 42 beneath the flap opening. In such case, particularly with somewhat shorter projections, the flap may be resiliently seated into the opening at the top of the box so that the edges of the portion 58c** will lock beneath the projections, i.e. in essentially the same manner as shown in FIG. 17. In this and other ways, features of any one of the several modifications shown may be embodied in the other forms, for achievement of corresponding purposes or results, and all within the general concept of the novel package embodying the inner box and the outer wrapping with the special opening characteristics of the flap structure.

FIG. 34 is another example of a single-piece box blank suitable for the improved package of the invention, e.g. to provide the inner structure of the wrapped box in FIGS. 15 to 17 or other views. Corresponding to similarly numbered parts in FIG. 1, the cardboard blank 140 of FIG. 34 has wide side wall portions 141, 142, a pair of respectively adjacent flaps **143*a*, 143*b* to be overlapped as one narrow side wall, and another pair of flaps 144*a*, 144*b*, also adjacent the wide portions, to constitute the other side wall. To form the top end of the box, there is an end tab 146 on the narrow side flap 143*a*, and long tabs or flaps 147, 148 along the end edges (in the finished box, the top edges) of the wide wall portions 141, 142. Narrow tabs 149, 150 are shown, to overlap the inner face of the portion 151 which joins the parts 141, 142 and which constitutes the bottom of the box. Although the tabs 149, 150 can alternatively be hinged to the bottom portion 151 or can be omitted altogether, they are shown as hinged to the narrow side flaps 143*a*, 144*a***.

The top-forming tab 148 has a flap portion 158 hinged at 161, and the other top tab 147 has a flap 163 hinged at 164, the tabs 158, 163 being identical in shape and purpose with the tabs 58, 63 in FIG. 1.

The several described portions of the blank 140 are defined by appropriately scored or creased lines (to facilitate folding) or by lines of severance, as indicated, to permit ready assembly into a box, as by suitable machine operation. For instance, the entire lower part including the wall portion 142 can be folded into parallel relation with the wall portion 141, forming right-angle corners along the bottom portion 151. The side wall flaps **144*a* and 144*b* are folded toward each other, to overlap, with the tab 150 brought in to lie on the inner face of the portion 151, similar treatment being given the flaps 143*a*, 143*b* and tab 149. At this (or earlier) stage, the cigarettes, e.g. 20 of them, are inserted, and the top is then closed, as by successively folding down the flaps 146, 148 and 147**. The various overlapping portions are glued together, so that a rigid, unitary, closed structure is provided, similar in character to the completed box of FIGS. 7 to 9.

In accordance with the invention, suitable means or structure is provided for ready opening of the flap assembly 158—163, and for releasably holding the flap down after it has been opened, exactly as in any one or another of the embodiments of FIGS. 1 to 33 or modifications thereof. By way of example, FIG. 34 shows structure corresponding to FIGS. 1 to 9, including a cut-out portion below the end of the flap, provided by cutting down parts of the side wall flaps **144*a* and 144*b* at 166*a*, 166*b*. Likewise, for instance, re-locking ridges or beads 167, 168 are embossed in the side walls 141, 142, just below the top opening which the flap 158—163** is arranged to cover. Finally, the assembled box is enclosed in a sealed wrapping of reinforced foil, exactly as shown in FIGS. 10 to 18, 23 to 26 and 30 to 33, to constitute a completed package of identical nature and function.

Made with any of the illustrated blanks (or otherwise), each of the several forms of finished structure as shown in the drawings or as otherwise contemplated herein, constitutes a new and unusually effective package for cigarettes, which may be manufactured with an economy of materials and machine or process operations, for the attainment of the various objects and advantages hereinabove described. The improved package structures, e.g. as embodied in an arrangement of an inner box with a sealed wrapping of reinforced foil, are adaptable for packing or containing other articles or materials than cigarettes, and to that end the packages may be constructed in various proportions and with various dimensions appropriate to the desired use, so long as the shape of the box and the nature of its parts afford the desired realization of features of novelty here described.

It is to be understood that the invention is not limited to the specific structures herein disclosed but may be embodied in other forms without departure from its spirit.

I claim:

1. A cigarette package, comprising a box of the crush-proof type containing cigarettes therein, said box being formed of cardboard and including as parts thereof, two relatively wide side wall panels and two relatively narrow side wall panels all formed as parts of a single integral blank, a bottom wall also formed by at least one part of said blank, and a top wall formed by at least two parts of said blank which are adhesively secured together in overlapping relation, tab portions substantially as wide as said relatively narrow side wall panels and extending a minor portion of the width of said relatively wide panels, said tab portions being formed by at least two overlapping portions of said top wall, which are adhesively secured together and which are integrally attached to other portions of said top wall solely at a fold line which is parallel to the line of juncture of said top wall and one of said narrow side wall panels, with said tab portions otherwise unattached to said side wall panels and having no portion overlapping said side wall panels, the one of said relatively narrow side wall panels adjacent to said tab portions being integrally attached to the contiguous relatively wide side wall panels except at the topmost portions of the latter, so as to provide an area adjacent to the uppermost portion of this narrow side wall panel into which the fingernail of a user can be inserted to project under an edge portion of said tab portions for lifting said tab portions to give access to the cigarettes in said package; a wrapping of laminated metal-paper sheet completely enclosing said box and the cigarettes therein and adhesively secured to said box at least on the top wall thereof including said tab portions of said top wall; and adhesive material further securing said wrapping to the upper portions of said side walls of said box adjacent to said tab portions of said top wall, serving to prevent separation of portions of said wrapping from said box and from said tab portions of the top wall thereof after said box has been opened, and also serving to assure that upon lifting of said tab portions said wrapping will be broken substantially in a predetermined line which extends about three sides of said tab portions, while portions of said wrapping substantially contiguous to said line will remain adhered to corresponding portions of said side wall panels and to said tab portions.

2. A cigarette package in accordance with claim 1, further comprising at least one ridge formed on a part of one of said side panels adjacent to and substantially parallel with an edge portion of said tab portions and adapted to coact therewith to act as a latch on the reclosing of said tab portions following the initial opening thereof as aforesaid for the removal of a cigarette from said package and serving resiliently to prevent inadvertent reopening of said tab portions.

3. A cigarette package in accordance with claim 1, said relatively narrow side panel which is unattached to the contiguous relatively wide side panels adjacent to the topmost portions of the latter being formed of lesser height than said relatively wide side panels, so as to provide an opening beneath the end of said tab portions extending between said relatively wide panels into which the fingernail of a user of the package may be projected for opening the package.

4. A cigarette package in accordance with claim 1, said relatively narrow side panel which is unattached to the contiguous relatively wide side panels adjacent to the topmost portions of the latter being slit from the upper portions of said relatively wide panels so that the uppermost portion of said relatively narrow panel may be moved inwardly by pressure of the fingernail of a user in projecting such fingernail beneath the outer end of said tab portions for forcing such tab portions upwardly in initially opening the package to give access to the cigarettes therein.

References Cited in the file of this patent

UNITED STATES PATENTS

| | | |
|---|---|---|
| Re. 23,266 | Thomas | Sept. 5, 1950 |
| 788,381 | Smith | Apr. 25, 1905 |
| 850,345 | Conover | Apr. 16, 1907 |
| 1,152,355 | Sutton | Aug. 31, 1915 |
| 1,548,237 | Ackerman | Aug. 4, 1925 |
| 1,884,545 | Boutin | Oct. 25, 1932 |
| 1,919,100 | Field | July 18, 1933 |
| 2,115,673 | Stompe | Apr. 26, 1938 |
| 2,358,923 | Guyer | Sept. 26, 1944 |
| 2,364,439 | Guyer | Dec. 5, 1944 |
| 2,415,387 | Graebner et al. | Feb. 4, 1947 |

FOREIGN PATENTS

| | | |
|---|---|---|
| 448,146 | France | Nov. 18, 1912 |